(12) United States Patent
Yeh

(10) Patent No.: US 9,242,689 B2
(45) Date of Patent: Jan. 26, 2016

(54) FOAM SADDLE

(71) Applicant: Tzong In Yeh, Fremont, CA (US)

(72) Inventor: Tzong In Yeh, Fremont, CA (US)

(*) Notice: Subject to any disclaimer, the term of this patent is extended or adjusted under 35 U.S.C. 154(b) by 8 days.

(21) Appl. No.: 14/146,916

(22) Filed: Jan. 3, 2014

(65) Prior Publication Data

US 2015/0191209 A1 Jul. 9, 2015

(51) Int. Cl.
| B62J 1/18 | (2006.01) |
| B62J 1/22 | (2006.01) |
| B62J 1/26 | (2006.01) |
| B62J 1/00 | (2006.01) |

(52) U.S. Cl.
CPC ... *B62J 1/26* (2013.01); *B62J 1/007* (2013.01)

(58) Field of Classification Search
CPC .................................... B62J 1/007; B62J 1/26
USPC ......................................................... 297/214
See application file for complete search history.

(56) References Cited

U.S. PATENT DOCUMENTS

| 4,429,915 | A | * | 2/1984 | Flager | 297/214 X |
| 4,815,361 | A | * | 3/1989 | Chiarella | 297/214 |
| 4,999,068 | A | * | 3/1991 | Chiarella | 297/214 X |
| 5,904,396 | A | * | 5/1999 | Yates | 297/214 |
| 6,007,149 | A | * | 12/1999 | Yates | 297/214 |
| 6,030,035 | A | * | 2/2000 | Yates | 297/214 |
| 6,257,662 | B1 | * | 7/2001 | Yates | 297/214 |
| 6,409,865 | B1 | * | 6/2002 | Yates | 156/214 |
| 2004/0051352 | A1 | * | 3/2004 | Bigolin | 297/214 |
| 2011/0233973 | A1 | * | 9/2011 | Wyner et al. | 297/214 |
| 2014/0054937 | A1 | * | 2/2014 | Sam et al. | 297/214 |
| 2014/0159445 | A1 | * | 6/2014 | Sam et al. | 297/214 |

FOREIGN PATENT DOCUMENTS

| TW | M253539 | 12/2004 |
| TW | I323216 | 4/2010 |
| TW | I340706 | 4/2011 |
| TW | M452113 U1 | 5/2013 |

* cited by examiner

*Primary Examiner* — Rodney B White
(74) *Attorney, Agent, or Firm* — Muncy, Geissler, Olds & Lowe, P.C.

(57) ABSTRACT

A foam saddle is disclosed, where the foam saddle comprises a first casing, a second casing, a foam body and an intensified structure. The second casing is capped on the first casing. The foam body is formed in a cavity of the first casing and is bound to the first casing and the second casing. The intensified structure is embedded in the foam body. By means of the above structure, the first casing of the foam saddle of this invention and the foam body possess great bonding in between, and the foam body and the intensified structure possess great bonding in between too.

5 Claims, 9 Drawing Sheets

FOAM SADDLE

BACKGROUND OF THE INVENTION

1. Field of the Invention

The present invention disclosed herein relates, in general, to foam saddles. More specifically, the present invention relates to a foam saddle having a first casing in which a foam body is formed and an intensified structure is embedded therein, where the first casing is capped by a second casing to have the foam body enclosed in between.

2. Description of the Prior Art

A prior bike saddle 9, as in some Taiwan patents (Taiwan Patent No. TW M452113, I340706, and M253539), shown in FIG. 14, comprises a hard bottom housing 91, a foam body 92 and a skin 93. The foam body 92 is attached to the top of the hard bottom housing 91 while the skin 93 is laminated adhesively to the top of the foam body 92 to protect it 92. The hard bottom housing 91 is generally made from plastic or metal. The foam body 92 is foamed by foam material of polyethylene. And the skin 93 is made from thermoplastic rubber, thermoplastic polyurethane, polyethylene and the like.

The applicant's previous patent application, Taiwan Patent No. I323216, discloses a method of manufacturing a foam product, where the method is first to place a thermoplastic plastic skin in a mold, and then to inject plural foam particles into the mold, followed by the foaming of the foam particles by means of high temperature pressurization and at the same time by the bonding to the plastic skin by means of thermal welding, eventually to obtain a foam product that comprises a plastic skin and a foam body formed by the foaming of polyethylene foam particles.

SUMMARY OF THE INVENTION

The present invention is to provide a novel foam saddle, which comprises a first casing, a second casing, a foam body and an intensified structure. The second casing caps the first casing. The foam body is bound in between the first casing and the second casing. The intensified structure is embedded in the foam body.

On the other hand, the method for the production of the foam saddle comprises the following steps. Firstly, a multilayer material is placed in a mold for thermoforming to form a first casing, where the first casing is provided with a cavity. Next, the first casing is placed in another mold, and plural foam particles and an intensified structure are placed in the cavity of the first casing. Then, the foam particles are forming to form a foam body bound to an inner surface of the first casing, and the intensified structure is embedded in the foam body. Lastly, a second casing is capped to the first casing, and an inner surface of the second casing is bound to the foam body, where the foam body is enclosed in between the second casing and the first casing. Preferably, the foam particles are made from foam material containing polypropylene.

In a detailed description, the foam body is provided with a top surface, a first side surface adjacent to the top surface, a second side surface adjacent to the first side surface and a bottom surface adjacent to the second side surface. The inner surface of the first casing is bound to the top surface of the foam body and the first side surface. The inner surface of the second casing is bound to the bottom surface and the second side surface of the foam body.

The first casing comprises a foam skin and a foam sheet bound to an inner surface of the foam skin. The foam skin is preferably foamed out of a foam material with added rubber.

Furthermore, the foam skin is foamed out of a foam material with added rubber and containing polyethylene and polypropylene.

Preferably, the foam sheet comprises a first foam plate and a second foam plate bound to an inner surface of the first foam plate; an outer surface of the first foam plate is bound to the inner surface of the foam skin, where the first foam plate and the second foam plate are foamed out of the foam material containing polyethylene.

Preferably, the first casing further comprises a plastic film, bound to the outer surface of the foam skin, where the plastic film is made from the material selected from the group consisting of Surlyn resin, thermoplastic rubber, thermoplastic polyurethane, polyethylene and polyurethane.

Moreover, the second casing is a plastic casing, which is bound to the foam body by means of an adhesive.

The intensified structure comprises a base and a junction extending from the base, where the base is configured to attach to an external fixing member. The junction is provided with a through hole penetrating through its two opposite sides; the second casing is provided with two openings, facing the two opposite ends of the through hole of the junction respectively, and interconnecting with the through hole of the junction.

Compared with prior art, the foam body of the foam saddle of this invention is foamed out of plural foam particles in the cavity of the first casing, and the intensified structure is embedded in the foam body through the same foaming process as above. As a whole, the foam saddle of this invention possesses great bonding capability, either between the foam body and the first casing, or between the foam body and the intensified structure, which ensures inseparability under the impact of external forces.

Furthermore, this invention further provides another foam saddle of simple structure, comprising a first casing and a second casing, where the first casing is provided with a foam skin and a plastic film bound to the outer surface of the foam skin, and the second casing is bound to an inner surface of the foam skin and is provided with a junction at its bottom surface for mounting a bike frame. Preferably, the first casing encloses the whole bottom surface and the rim of the second casing, where the foam skin is preferably made from the material selected from the group consisting of foam material with added rubber, foam material with added rubber and containing either polyethylene or polypropylene, and ethylene vinyl acetate copolymer while the plastic film is preferably made from the material selected from the group consisting of ionomer resin, thermoplastic rubber, thermoplastic polyurethane, polyethylene and polyurethane.

Other invention contents, detailed techniques and the features of this invention are disclosed in the following description.

DETAILED DESCRIPTION OF THE INVENTION

Figure 1:
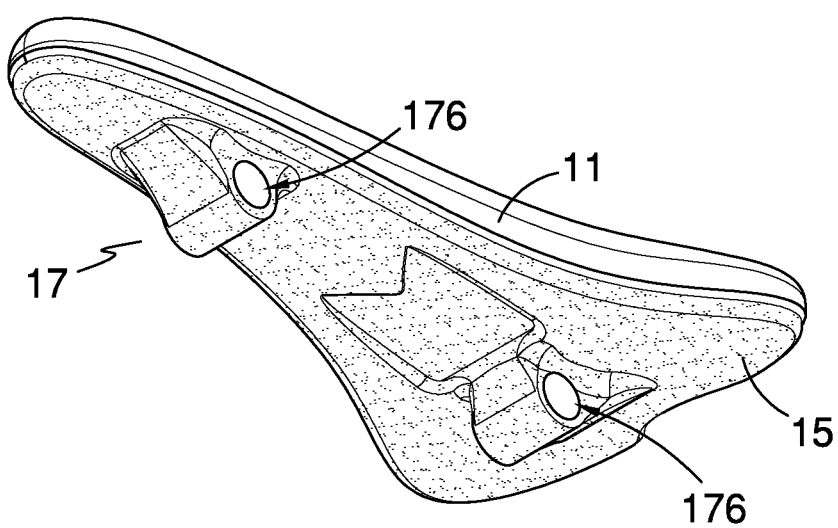
FIG. 1 is a three-dimensional exploded view of the foam saddle of a preferred embodiment of the present invention.
Figure 1:
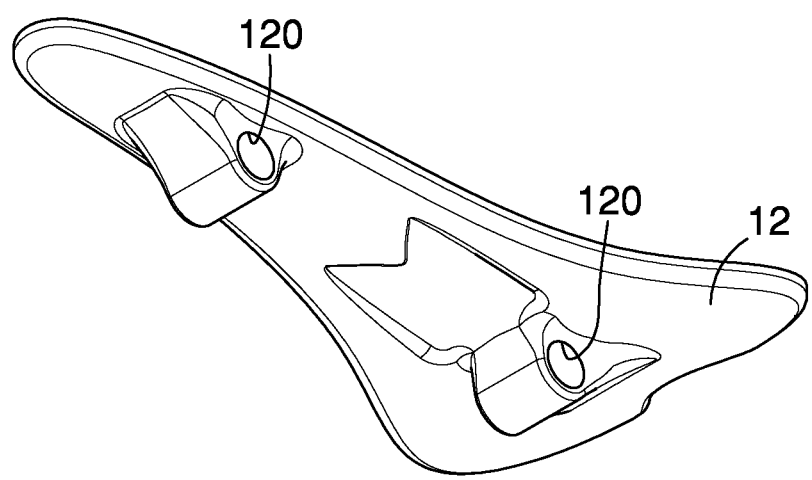
Figure 2:
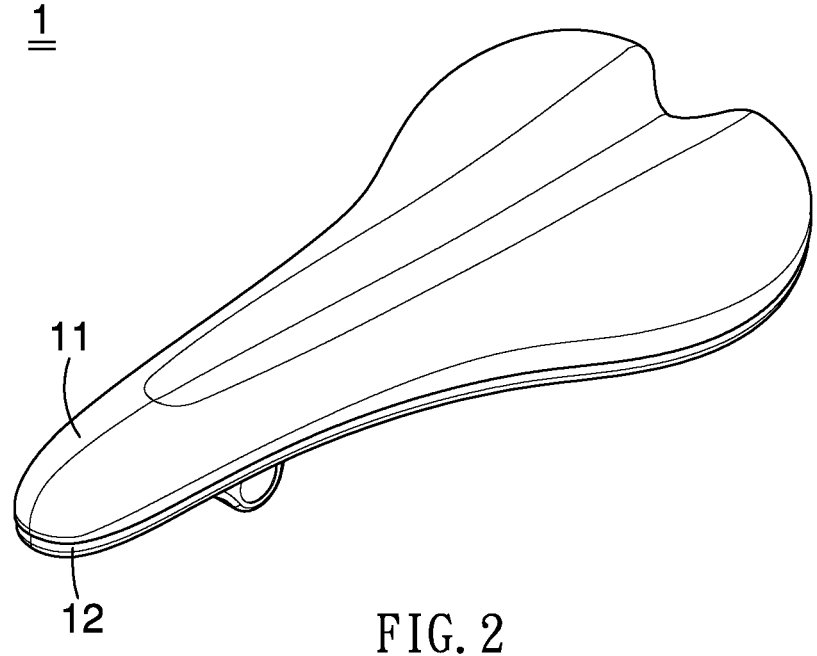
FIG. 2 is a three-dimensional assembled view of the preferred embodiment.
Figure 3:
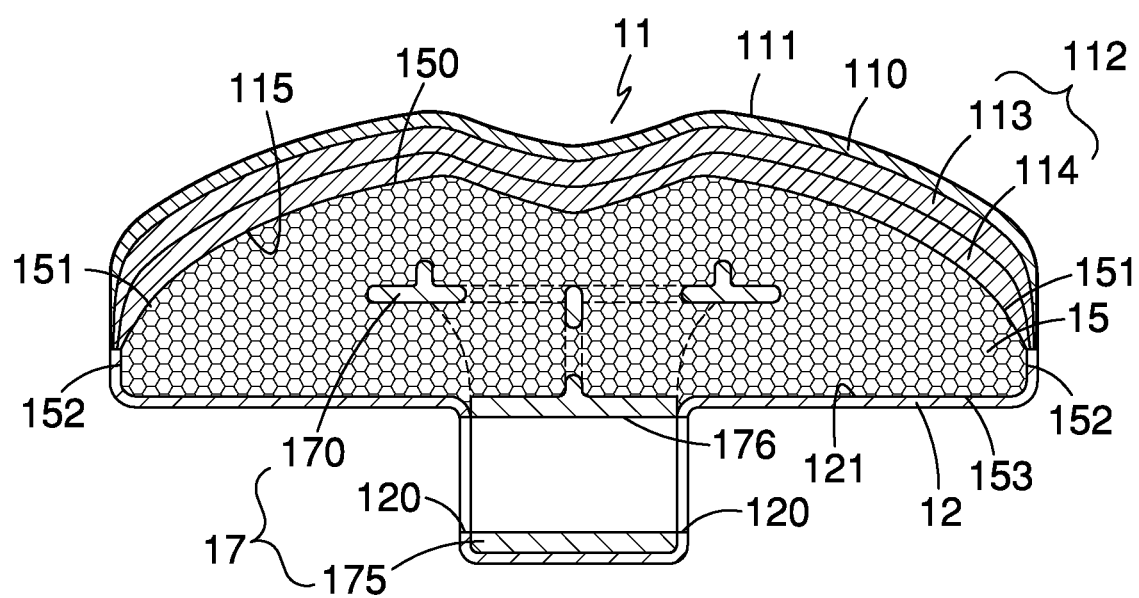
FIG. 3 is a transverse cross-sectional diagram of the preferred embodiment.

FIGS. 1, 2 and 3 show the foam saddle of a preferred embodiment of this invention. The foam saddle 1 comprises a first casing 11, a second casing 12 able to cap the first casing 11, a foam body 15 bound in between the first casing 11 and the second casing 12, and an intensified structure 17 embedded in the foam body 15.

Figure 4:
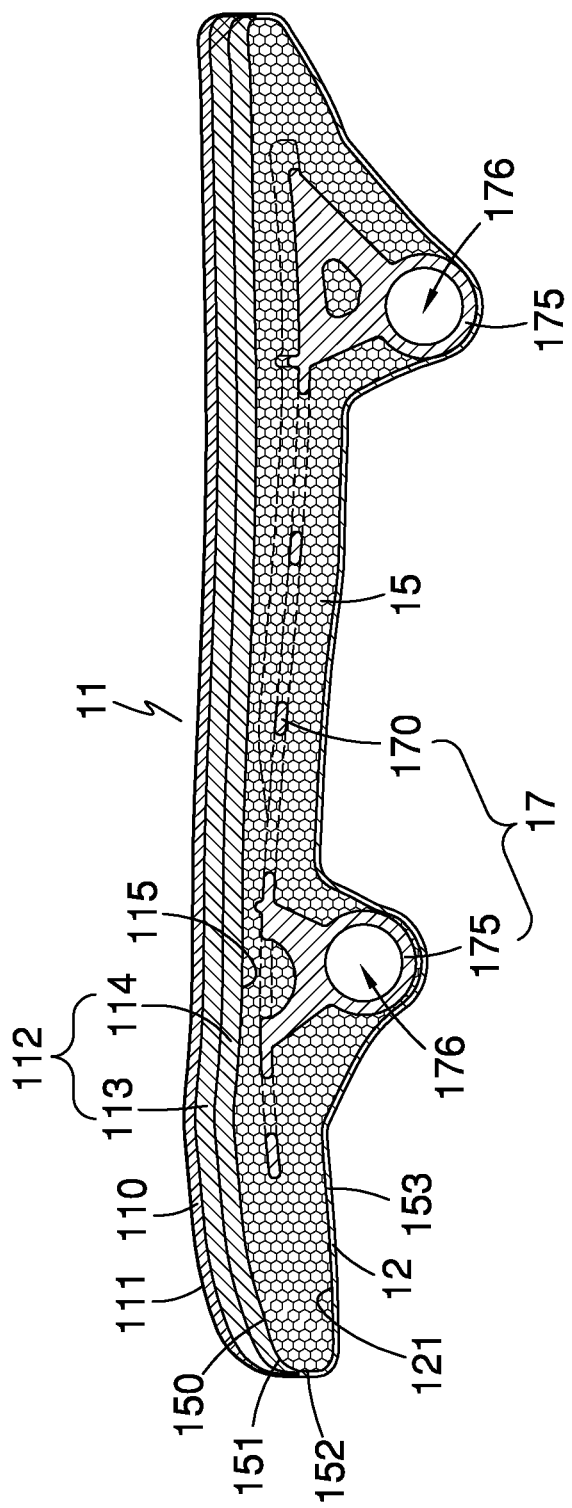
FIG. 4 is a longitudinal cross-sectional diagram of the preferred embodiment.

As shown in FIGS. 3 and 4, the first casing 11 comprises a foam skin 110, a plastic film 111 bound to the outer surface of the foam skin 110, and a foam sheet 112. It is worth noting, in this embodiment, the foam sheet 112 comprises a first foam plate 113 bound to the inner surface of the foam skin 110 and a foam plate 114 bound to the inner surface of the first foam plate 113, in order to offer enough thickness to the first casing 11. However, it can also be replaced by a single foam plate with an enough thickness, not for limiting hereof. Specifically, the foam skin 110 is foamed out of the foam material with added rubber and containing polyethylene (PE) or polypropylene (PP), and its foam density is within 2 pcf up to 8 pcf; therefore, the foam skin 110 simultaneously possesses elasticity and softness. The plastic film 111 is made from material featuring abrasion proof and anti-skid, for instance: Surlyn resin, thermoplastic rubber (TPR), thermoplastic polyurethane (TPU), polyethylene (PE) or polyurethane (PU). The first foam plate 113 and the second foam plate 114 are foamed out of the foam material containing PE, and its foam density is about 2 pcf.

The foam body 15, preferably foamed out of the foam material containing PP, comprises a top surface 150, a first side surface 151 adjacent to the top surface 150, a second side surface 152 adjacent to the first side surface 151 and a bottom surface 153 adjacent to the second side surface 152. Preferably, the top surface 150 of the foam body 15 and the first side surface 151 are bound directly to the inner surface 115 of the second foam plate 114 of the first casing 11, or bound to the inner surface 115 of the second foam plate 114 by means of a bonding film (not shown in the figure), depending on the materials selected for the foam body 15 and the second foam plate 114 respectively.

The second casing 12 is a plastic casing formed by plastic injection molding, where its inner surface 121 is preferably bound to the second side surface 152 and the bottom surface 153 of the foam body 15 through an adhesive (not shown in the figure). The adhesive can be coated on the inner surface 121 of the second casing 12, or coated on the second side surface 152 and the bottom surface 153 of the foam body 15.

Figure 5:
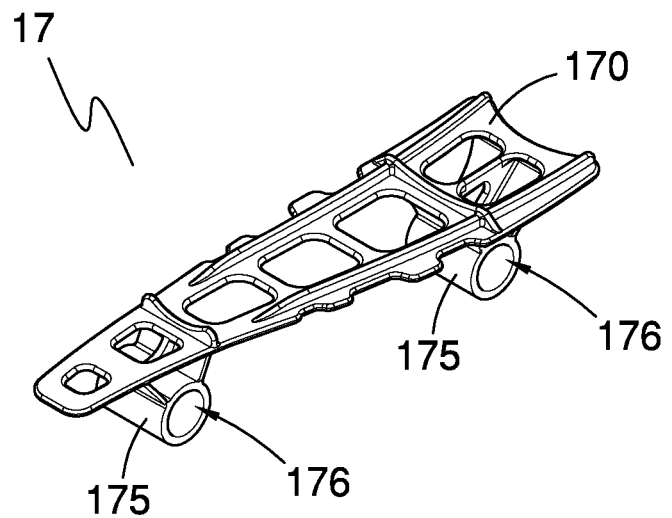
FIG. 5 is a three-dimensional diagram of an intensified structure of the preferred embodiment.

Reference to FIGS. 3, 4 and 5, in this embodiment, the intensified structure 17 comprises a base 170 and two junctions 175 extending from the base 170. The base 170 is completely embedded in the foam body 15 to reinforce the structural strength of the foam body 15. The two junctions 175 are configured to attach to an external fixing member (not shown in the figure), for instance: the frame of a bike. However, depending on different demands, the intensified structure 17 can be provided with one junction only or plural junctions. Specifically, in this embodiment, each junction 175 is provided with a through hole 176 that penetrates through its two opposite sides, where the two opposite sides of the through hole 176 are aligned with two openings 120 of the second casing 12, and the junction 175 attaches to the outside through the two openings 120 of the second casing 12 shown in FIG. 3, to offer penetration and bonding for the external fixing member.

Figure 6:
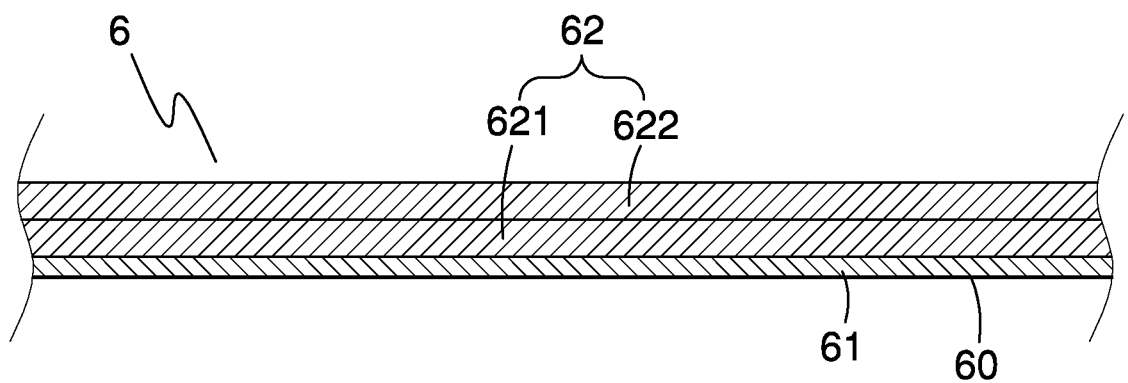
FIG. 6 is a multilayer structure used in the method for manufacturing the foam saddle of this invention.
Figure 7:
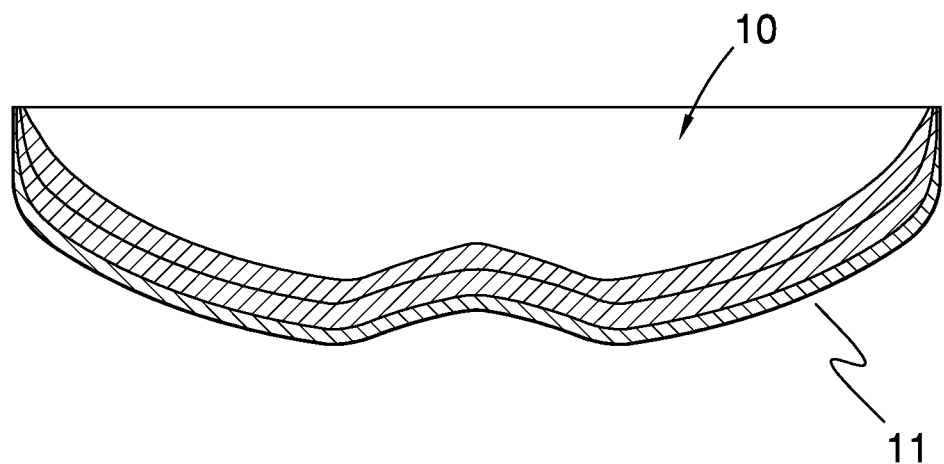
FIG. 7 is a cross-sectional diagram of a first casing that is formed by the thermoforming on the multilayer structure in FIG. 6.
Figure 8:
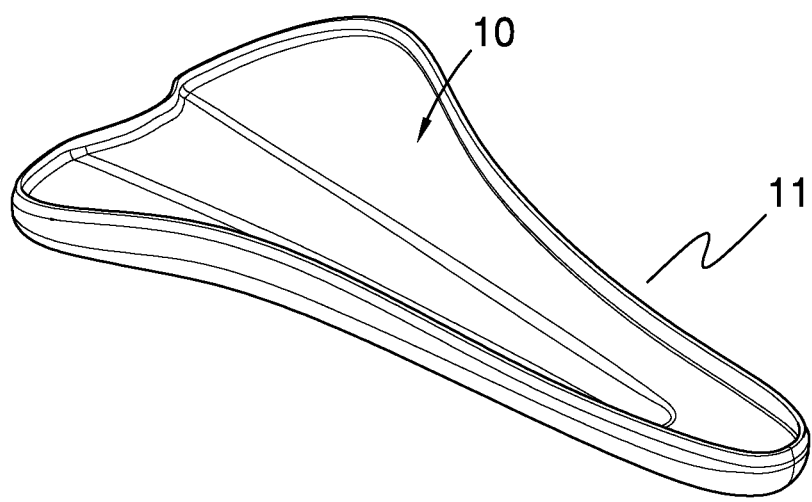
FIG. 8 is a three-dimensional diagram of FIG. 7.
Figure 9:
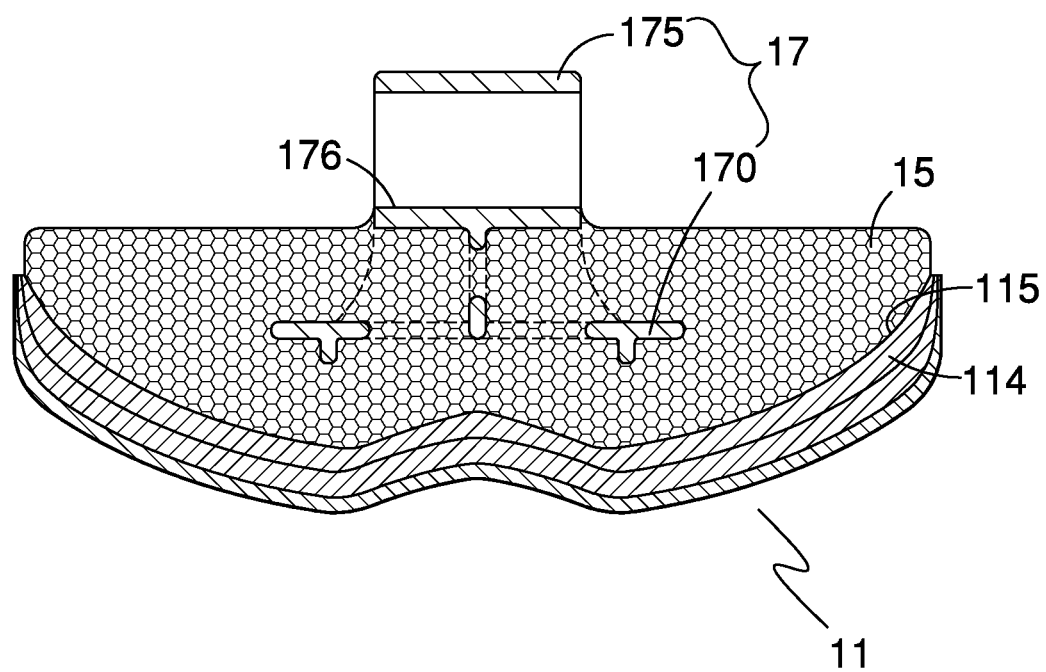
FIG. 9 is a cross-sectional diagram of the intensified structure embedded in the foam body and the foam body formed in the first casing.

FIGS. 6 to 10 show the method to manufacture the above foam saddle 1. First of all, as shown in FIG. 6, a multilayer material 6 is provided, where the multilayer material 6 comprises a foam skin 61, and its outer surface is thermally pasted with a plastic film 60 while its inner surface with a foam sheet 62. The foam sheet 62 comprises a first foam plate 621 and a second foam plate 622 that adhere one with the other. The first foam plate 621 has its outer surface thermally pasted to the foam skin 61. And the second foam plate 622 has its outer surface thermally pasted to the inner surface of the first foam plate 621. Preferably, the thickness of the plastic film 60 is about 0.01 mm to 0.5 mm while the thickness of the foam skin is about 2 mm to 3 mm, and the thicknesses of the first foam plate 621 and the second foam plate 622 are about 5 mm. On the other hand, the net thickness of the multilayer material 6 is about 12 mm to 13.5 mm. Besides, the plastic film 60, the foam skin 61 and the foam sheet 62 possess the same material and foam density as the plastic film 111, the foam skin 110 and the foam sheet 112 of the first casing 11 of the foam saddle 1 do respectively.

Next, the multilayer material 6 is placed in a mold (not shown in the figure) for thermoforming into a predetermined shape, and the aforesaid first casing 11 comes out; at this time, the plastic film 60, the foam skin 61 and the foam sheet 62 of the multilayer material 6 form the aforesaid plastic film 111, the foam skin 110 and the foam sheet 112 of the first casing 11 respectively. Moreover, the first casing 11 is provided with a cavity 10 at its inside, shown in FIGS. 7 and 8. It's worth to notice that the multilayer material 6, in the process of above thermoforming, suffers a squeeze to lessen its thickness; specifically, the multilayer material 6 is thermoformed into the first casing 11, with a thickness of about 8 mm, which is less than its original thickness.

In the following, the first casing 11 is placed in another mold (not shown in the figure), and plural foam particles and an intensified structure 17 (FIG. 5) are placed in the cavity 10 of the first casing 11. Preferably, the foam particles are foamed out of a foam material containing polypropylene. Then, the foam particles are formed, to form the aforementioned foam body 15. During the foaming, the inner surface 115 of the second foam plate 114 located at the inmost of the first casing 11 appears a bit melted state under a heating. Therefore, the foam body 15, once in foaming completion, will be thermally melted together with the inner surface 115 of the first casing 11, and the intensified structure 17 is embedded in the foam body 15, shown in FIG. 9. The through holes 176 of the junctions 175 of the intensified structure 17 are exposed externally to the foam body 15. Furthermore, the bonding between the inner surface 115 of the second foam plate 114 and the foam body 15, which select different materials respectively, could be accomplished by means of a bonding film, for instance, a copolymer, which is a material polymerized by the material of the second foam plate 114 and the material of the foam body 15.

Figure 10:
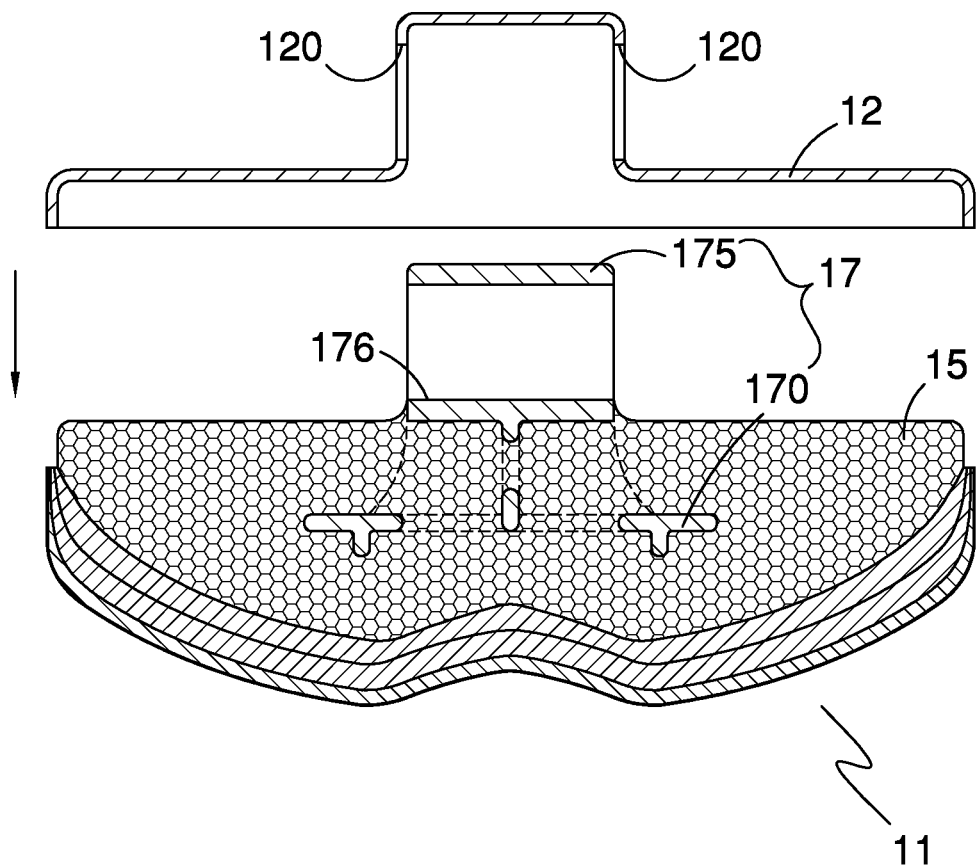
FIG. 10 is a schematic diagram of a second casing capping the first casing that is bound by the foam body to its inside.

Finally, as shown in FIG. 10, a second casing 12 is capped on the first casing 11, and the inner surface of the second casing 12 is bound to the foam body 15, to have the foam body enclosed in between the second casing 12 and the first casing 11, shown in FIG. 3. The openings 120 of the second casing 12 are aligned with the through holes 176 of the junctions 175 of the intensified structure 17.

Accordingly, this invention is to provide a foam saddle of great bonding, where its foam body is foamed in the cavity of the first casing, to bind closely with the first casing, not easy to split by the external forces. Besides, the intensified structure is surrounded by the foam particles during the foaming into the foam body, which enables the intensified structure firmly embedded in the foam body after the foaming of the foam body.

Figure 11:
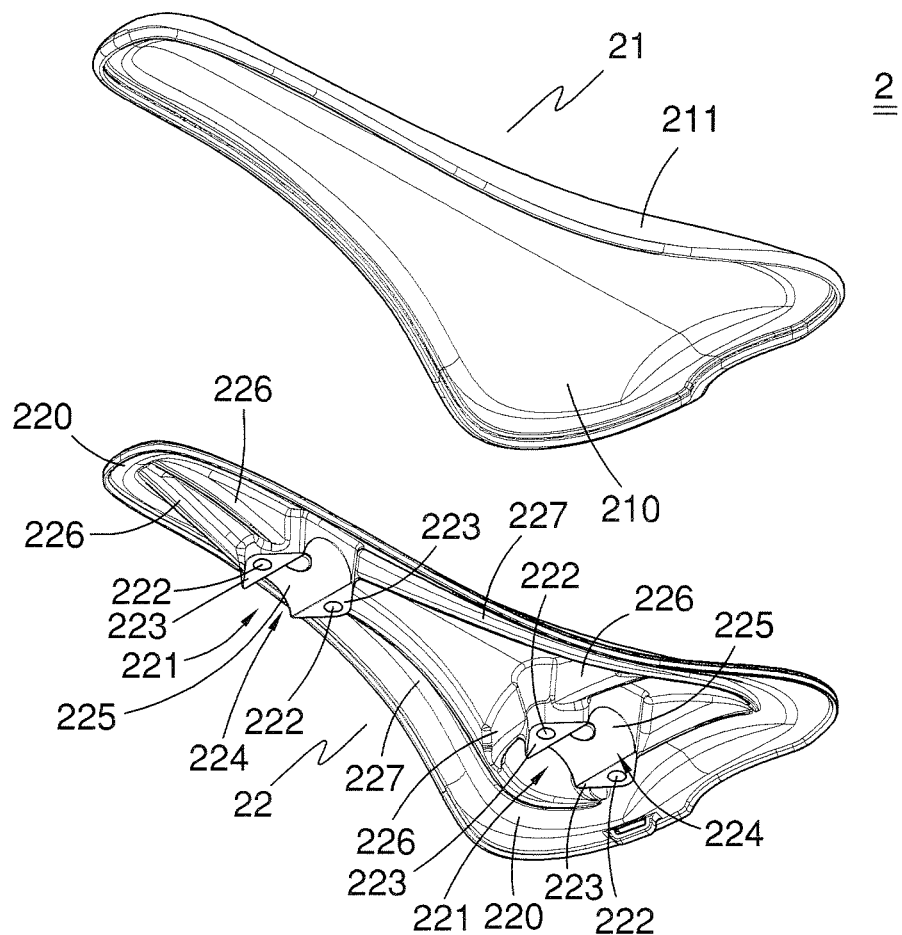
FIG. 11 is a three-dimensional exploded view of the foam saddle of another preferred embodiment.
Figure 12:
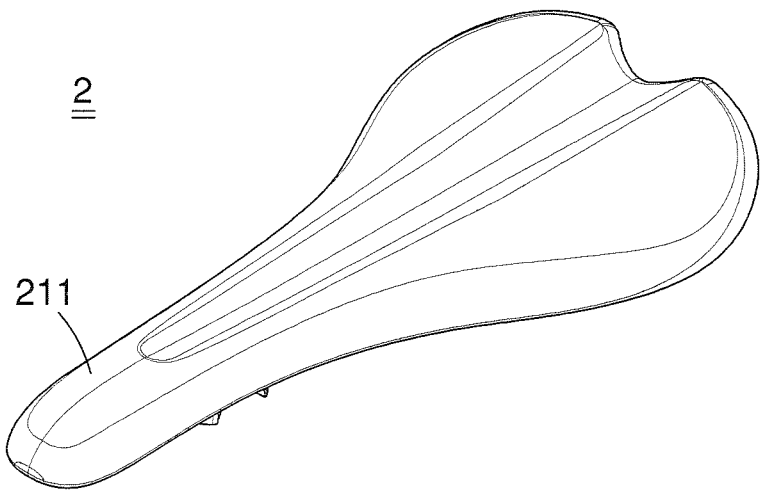
FIG. 12 is a three-dimensional assembled view of the foam saddle of another preferred embodiment.
Figure 13:
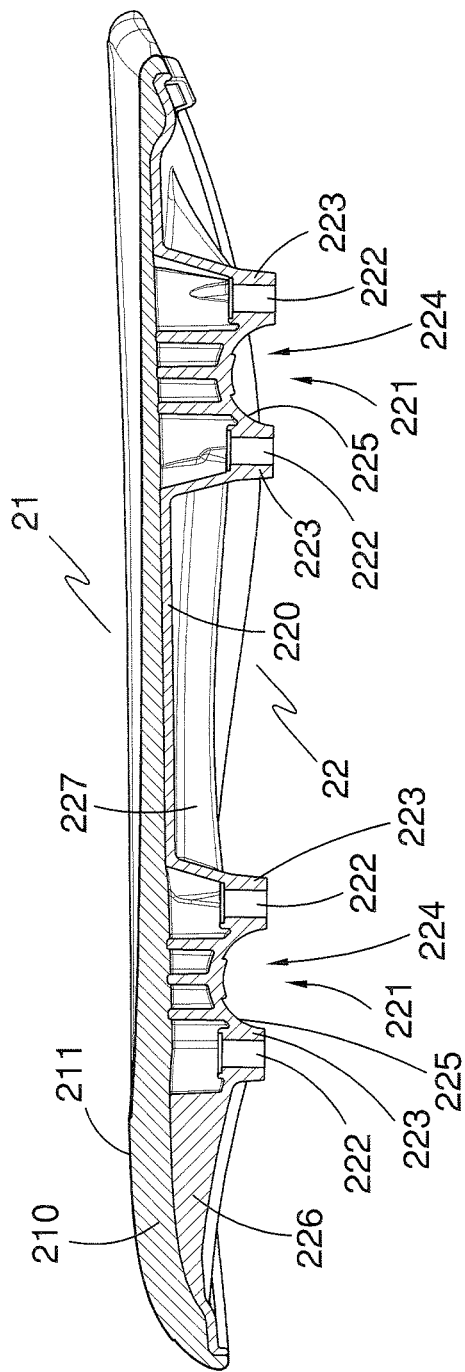
FIG. 13 is a transverse cross-sectional diagram of the foam saddle of another preferred embodiment.
Figure 14:
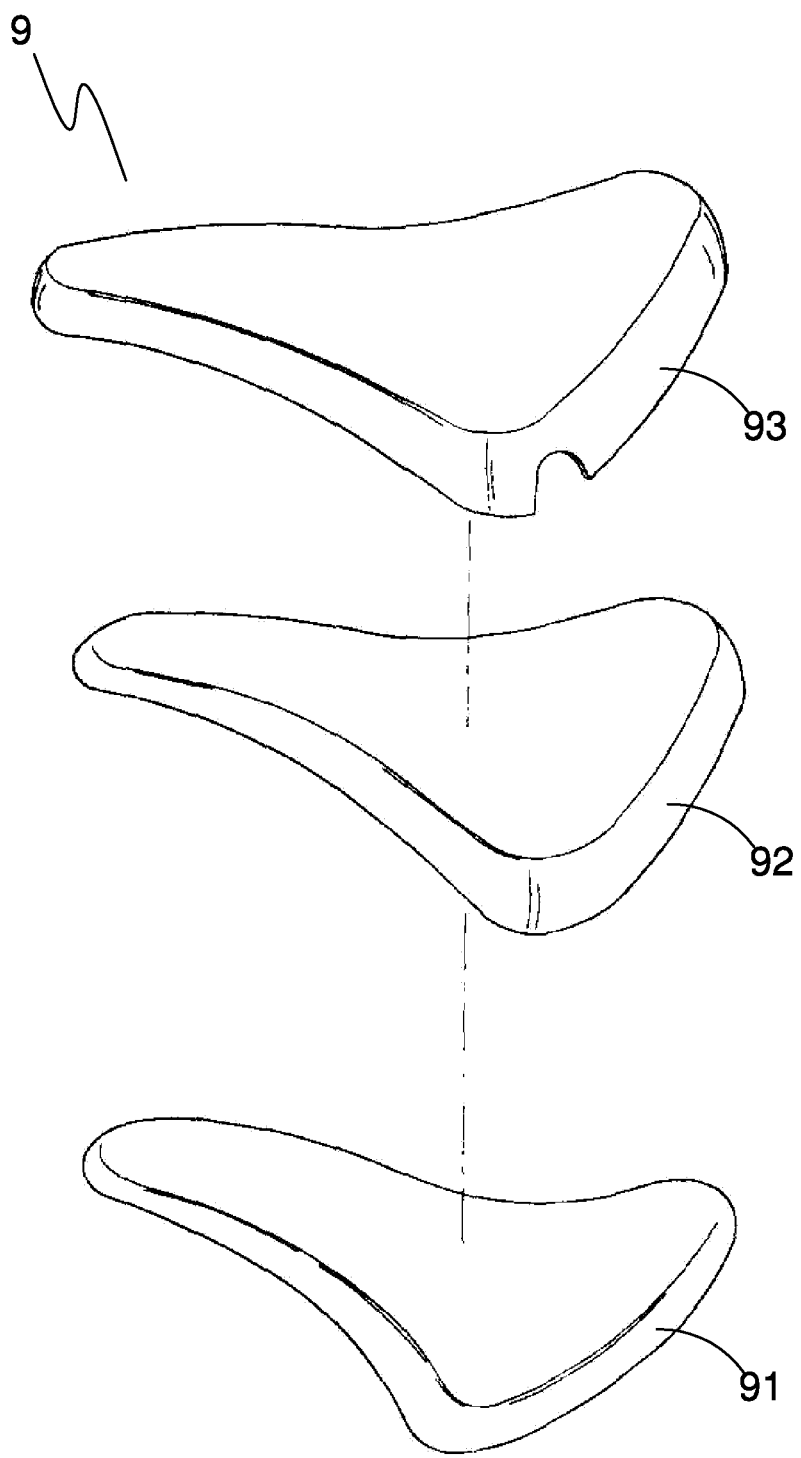
FIG. 14 shows the prior foam saddle.

FIGS. 11 to 13 show another embodiment of this invention, where the foam saddle 2 is similar to the aforementioned foam saddle 1, and the difference lies in: the first casing 21 of the foam saddle 2 comprises a foam skin 210 and a plastic film 211, and is bound directly to a second casing 22 through an adhesive. In this example, the foam body 15 of the aforementioned foam saddle 1, the intensified structure 17 and the foam sheet 112 are not in use, simple in structure substantially.

Moreover, a preferable method of manufacturing the foam saddle 2 is to finish the manufacturing of the first casing 21 and the second casing 22 and proceed to bind the two next, for instance to bind them with an adhesive. The production step of the first casing 21 comprises thermally pressing a flat plastic film with a flat foam skin for binding one with the other, followed by placing the bound plastic film and foam skin in a forming mold for a heating, to form the first casing 21 with a predetermined saddle shape. In this example, the plastic film is chosen for thermoplastic poly urethane (TPU), and the foam skin is chosen for ethylene vinyl acetate (EVA). The second casing 22 is formed by plastic injection, which comprises plural junctions 221 for the attachment to the frame of a bike (not shown in the figure), where the junctions 221 each is provided with a number of junction holes 222. The junctions 221 extend downward from a bottom surface 220 of the second casing 22.

Each of the junctions 221 has two downwardly extending portions 223 and a concave portion 224 between the downwardly extending portions 223. Each of the downwardly extending portions 223 contains one of the junction holes 222 extending vertically through the downwardly extending portion 223 to the outside of the bottom surface 220 of the second casing 22. The concave portion 224 of each of the junctions 221 has a cambered bottom surface 225. The second casing 22 comprises a plurality of ribs which extend downward from the bottom surface 220 of the second casing 22 and connect with the junctions 221. The ribs comprise a plurality of first ribs 226 and a plurality of second ribs 227, each of the first ribs 226 has an end connecting with one of the junctions 221, the second ribs 227 connect with the junctions 221 and surround the junctions 221.

The other approach is to place the formed first casing 21 in a plastic injection mold, followed by injecting the melted plastic substance into the plastic injection mold. Thus, the second casing 22 formed by the plastic substance is able to bind firmly with the first casing 21 without the use of the adhesive. Moreover, as shown in FIG. 13, the first casing 21 encloses the whole top surface and the rim of the second casing 22. Once a rider sits on the foam saddle 2, his/her thighs contact with the softness of the first casing 21, instead of the hardness of the second casing 22; therefore, the rider is comfortable to sit on the foam saddle 2.

What is claimed is:

1. A foam saddle, comprising:

a first casing, comprising a foam skin and a plastic film, the foam skin having an outer surface and an inner surface opposite to the outer surface, the plastic film bound to the outer surface of the foam skin, wherein the plastic film has a thickness of 0.01 mm to 0.5 mm; and a hard second casing, formed by plastic injection, comprising a plurality of junctions for the attachment to a frame of a bike, wherein a whole top surface and a rim of the second casing directly contact with the inner surface of the foam skin or contact with the inner surface of the foam skin through an adhesive; the junctions extending downwardly from a bottom surface of the second casing;

wherein each of the junctions has two downwardly extending portions and a concave portion between the downwardly extending portions; each of the downwardly extending portions contains a junction hole extending vertically through the downwardly extending portion to the outside of the bottom surface of the second casing.

2. The foam saddle of claim 1, wherein the concave portion of each of the junctions has a cambered bottom surface.

3. A foam saddle, comprising:

a first casing, comprising a foam skin and a plastic film, the foam skin having an outer surface and an inner surface opposite to the outer surface, the plastic film bound to the outer surface of the foam skin, wherein the plastic film has a thickness of 0.01 mm to 0.5 mm; and a hard second casing, formed by plastic injection, comprising a plurality of junctions for the attachment to a frame of a bike, wherein a whole top surface and a rim of the second casing directly contact with the inner surface of the foam skin or contact with the inner surface of the foam skin through an adhesive; the junctions extending downwardly from a bottom surface of the second casing;

wherein the second casing comprises a plurality of ribs which extend downwardly from the bottom surface of the second casing and connect with the junctions.

4. The foam saddle of claim 3, wherein the ribs comprise a plurality of first ribs and a plurality of second ribs, each of the first ribs has an end connecting with one of the junctions, and the second ribs connecting with and surrounding the junctions.

5. The foam saddle of claim 3, wherein a thickness of each one of the ribs is smaller than the junctions.

* * * * *